United States Patent
Liu et al.

(10) Patent No.: US 11,719,875 B2
(45) Date of Patent: Aug. 8, 2023

(54) LIGHT SOURCE MODULE

(71) Applicant: CHAMP VISION DISPLAY INC., Miaoli County (TW)

(72) Inventors: Chin-Ku Liu, Miao-Li County (TW); Chung-Hao Wu, Miao-Li County (TW); Hsin-Hung Lee, Miao-Li County (TW)

(73) Assignee: CHAMP VISION DISPLAY INC., Miao-Li County (TW)

( * ) Notice: Subject to any disclaimer, the term of this patent is extended or adjusted under 35 U.S.C. 154(b) by 0 days.

(21) Appl. No.: 17/386,556

(22) Filed: Jul. 28, 2021

(65) Prior Publication Data
US 2022/0091322 A1 Mar. 24, 2022

(30) Foreign Application Priority Data
Sep. 24, 2020 (TW) ................................. 109133001

(51) Int. Cl.
*F21V 8/00* (2006.01)
(52) U.S. Cl.
CPC ......... *G02B 6/0043* (2013.01); *G02B 6/0068* (2013.01)
(58) Field of Classification Search
CPC .... G02B 6/0036; G02B 6/0068; G02B 6/006; G02B 6/34; F21V 8/00
See application file for complete search history.

(56) References Cited

U.S. PATENT DOCUMENTS

| | | | | |
|---|---|---|---|---|
| 6,002,079 A | * | 12/1999 | Shin | G02B 6/0038 84/464 R |
| 7,201,487 B2 | * | 4/2007 | Pinter | A47B 96/02 362/133 |
| 2009/0257245 A1 | * | 10/2009 | Kim | G02B 6/0061 362/626 |
| 2012/0188792 A1 | | 7/2012 | Matsumoto et al. | |

FOREIGN PATENT DOCUMENTS

| | | |
|---|---|---|
| CN | 105913783 | 8/2016 |
| JP | 5701434 | 4/2015 |
| TW | 201636661 | 10/2016 |

OTHER PUBLICATIONS

"Office Action of Taiwan Counterpart Application", dated Nov. 3, 2021, p. 1-p. 6.

* cited by examiner

*Primary Examiner* — William J Carter
(74) *Attorney, Agent, or Firm* — JCIPRNET

(57) ABSTRACT

A light source module including a light guide plate, a first light source and a plurality of first optical microstructures is provided. The light guide plate has a first incident surface and a bottom surface connected to the first incident surface. The first light source is disposed on a side of the first incident surface of the light guide plate. The first optical microstructures are disposed on the bottom surface. Each of the first optical microstructures has a first light receiving surface disposed toward the first light source. Each of the first light receiving surfaces of a first portion of the first optical microstructures has a first edge at a junction with the bottom surface, and a perpendicular bisector of the first edge passes through the first light source.

10 Claims, 12 Drawing Sheets

LIGHT SOURCE MODULE

CROSS-REFERENCE TO RELATED APPLICATION

This application claims the priority benefit of Taiwanese application serial no. 109133001, filed on Sep. 24, 2020. The entirety of the above-mentioned patent application is hereby incorporated by reference herein and made a part of this specification.

BACKGROUND

Technical Field

The disclosure relates to a light source module; particularly, the disclosure relates to a light source module with a display function.

Description of Related Art

As lighting technology advances, on the market, in addition to common lamps that provide lighting functions, decorative light panels have also been developed to provide decorative effects. In such a decorative light panel, optical microstructures are formed on a bottom surface of a light guide plate, and the position of each optical microstructure and the angle of its reflective surface are configured according to the effect required to be presented by the decorative light panel. Light emitted by a light source, after being incident from a surface (a light incident surface) of the light guide plate, may be reflected by the optical microstructures and then transmitted toward a light emitting surface of the light guide plate to be emitted. Thereby, users can see patterns or text formed of the light on a side of the light emitting surface of the light guide plate.

In recent years, in order to enhance visual experiences of the viewers, the demand for presenting three-dimensional images using decorative light panels has gradually increased. However, in order to present the three-dimensional images, the number of optical microstructures required to be disposed on the light guide plate will inevitably increase, which tend to cause the problems of overall brightness insufficiency and image size limitation to the displayed image.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a light source module with a better display effect for three-dimensional images.

Other objectives and advantages of the disclosure can be further understood from the technical features disclosed in the disclosure.

In order to achieve one, some, or all of the above or other objectives, an embodiment of the disclosure proposes a light source module. The light source module includes a light guide plate, a first light source and a plurality of first optical microstructures. The light guide plate has a first light incident surface and a bottom surface connected to the first light incident surface. The first light source is disposed on a side of a first light incident surface of the light guide plate. The first optical microstructures are disposed on the bottom surface of the light guide plate. The first optical microstructures each have a first light receiving surface. The first light receiving surfaces are disposed facing the first light source. The first light receiving surfaces of a first part of the first optical microstructures each have a first edge at a junction with the bottom surface, and a perpendicular bisector of the first edge passes through the first light source.

In an embodiment of the disclosure, the light source module also includes a second light source and a plurality of second optical microstructures. The second light source is disposed on a side of a second light incident surface of the light guide plate. The second light incident surface is disposed opposite the first light incident surface, and is connected to the bottom surface. The second optical microstructures are disposed on the bottom surface of the light guide plate. The second optical microstructures each have a second light receiving surface. The second light receiving surfaces of the second optical microstructures are disposed facing the second light source.

In an embodiment of the disclosure, the first part of the first optical microstructures forms a first pattern, and a second part of the first optical microstructures forms a second pattern.

In an embodiment of the disclosure, the first light source is configured to emit a plurality of first light beams toward the first light incident surface of the light guide plate, and the first light beams are transmitted within a range of a first light emitting region of the light guide plate. The second light source is configured to emit a plurality of second light beams toward the second light incident surface of the light guide plate, and the second light beams are transmitted within a range of a second light emitting region of the light guide plate. An area of an overlapping region between the first light emitting region and the second light emitting region is less than 10% of an area of the first light emitting region.

In an embodiment of the disclosure, a first angle is present between each of the first light receiving surfaces and the bottom surface, and a second angle is present between each of the second light receiving surfaces and the bottom surface. The first angle and the second angle fall within a range between 35 degrees and 55 degrees.

In an embodiment of the disclosure, the second light receiving surfaces of a first part of the second optical microstructures each have a second edge at a junction with the bottom surface, and a vertical bisector of the second edge passes through the second light source.

In an embodiment of the disclosure, the first light receiving surfaces of a second part of the first optical microstructures each have a third edge at a junction with the bottom surface, and the second light receiving surfaces of a second part of the second optical microstructures each have a fourth edge at a junction with the bottom surface. A first included angle is present between the perpendicular bisector of the first edge of each of the first optical microstructures and the first light incident surface, a second included angle is present between a perpendicular bisector of the second edge of each of the second optical microstructures and the second light incident surface, a third included angle is present between a perpendicular bisector of the third edge of each of the first optical microstructures and the first light incident surface, and a fourth included angle is present between a perpendicular bisector of the fourth edge of each of the second optical microstructures and the second light incident surface.

An angle difference between the first included angle and the third included angle of adjacent first optical microstructures is greater than an angle difference between the second included angle and the fourth included angle of adjacent second optical microstructures.

In an embodiment of the disclosure, the first included angle, the second included angle, the third included angle, and the fourth included angle are 90 degrees or fall within a range between 45 degrees and 90 degrees.

In an embodiment of the disclosure, the light source module also includes a third light source disposed on a side of the first light incident surface of the light guide plate. In an arrangement direction of the first light source and the third light source, the second light source is located between the first light source and the third light source. The second light source is configured to emit a plurality of second light beams, the second light beams are transmitted within a range of a second light emitting region of the light guide plate, the third light source is configured to emit a plurality of third light beams, and the third light beams are transmitted within a range of third light emitting region of the light guide plate. An area of an overlapping region of the second light emitting region and the third light emitting region is less than 10% of an area of the second light emitting region. In addition, a plurality of third optical microstructures are disposed on the bottom surface of the light guide plate, the third optical microstructures each have a third light receiving surface, and the third light receiving surfaces are disposed facing the third light source.

In an embodiment of the disclosure, the light source module also includes at least one first auxiliary light source disposed on a side of the first light incident surface of the light guide plate and located between the first light source and the third light source.

In an embodiment of the disclosure, the light source module also includes at least one first auxiliary light source disposed on a side of the first light incident surface of the light guide plate. The light guide plate has a length in a direction perpendicular to the first light incident surface. The first light source is configured to emit a plurality of first light beams toward the first light incident surface of the light guide plate. A distance between each of the at least one first auxiliary light source and the first light source is less than 2L·tan(θ), where θ is a maximum included angle between the first light beams and a normal direction of the first light incident surface.

Based on the foregoing, in the light source module according to an embodiment of the disclosure, the light guide plate has the first light incident surface and the second light incident surface that are disposed opposite each other, and the bottom surface that is connected to the light incident surfaces. In addition, the first light source and the second light source are respectively disposed on two sides of the two light incident surfaces of the light guide plate. Through disposing the first optical microstructures facing the first light source and disposing the second optical microstructures facing the second light source on the bottom surface of the light guide plate, the large-size image display can be realized, and the overall image brightness and uniformity can be improved at the same time.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
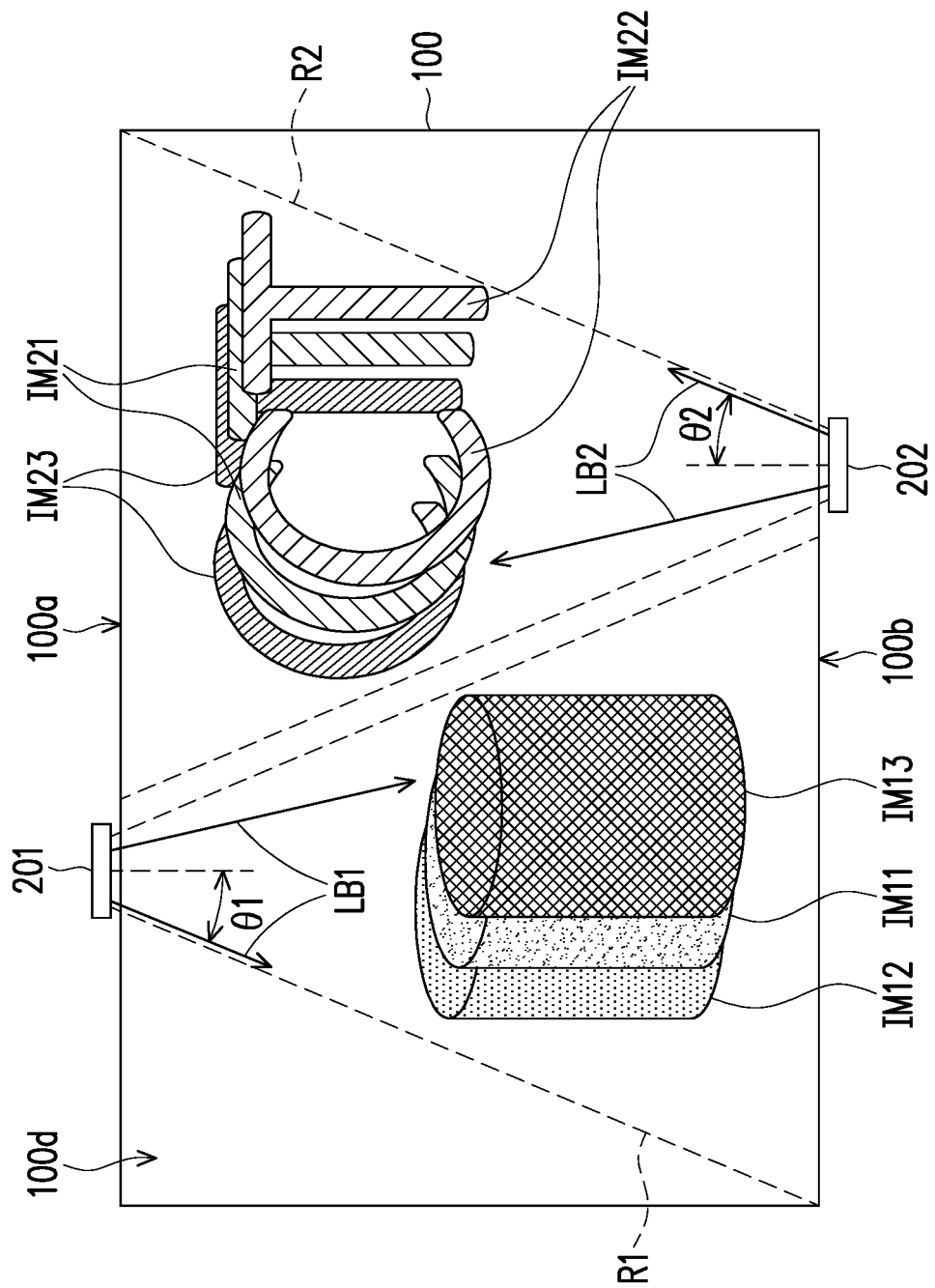
FIG. 1 is a schematic front view of a light source module according to the first embodiment of the disclosure.
Figure 2A:
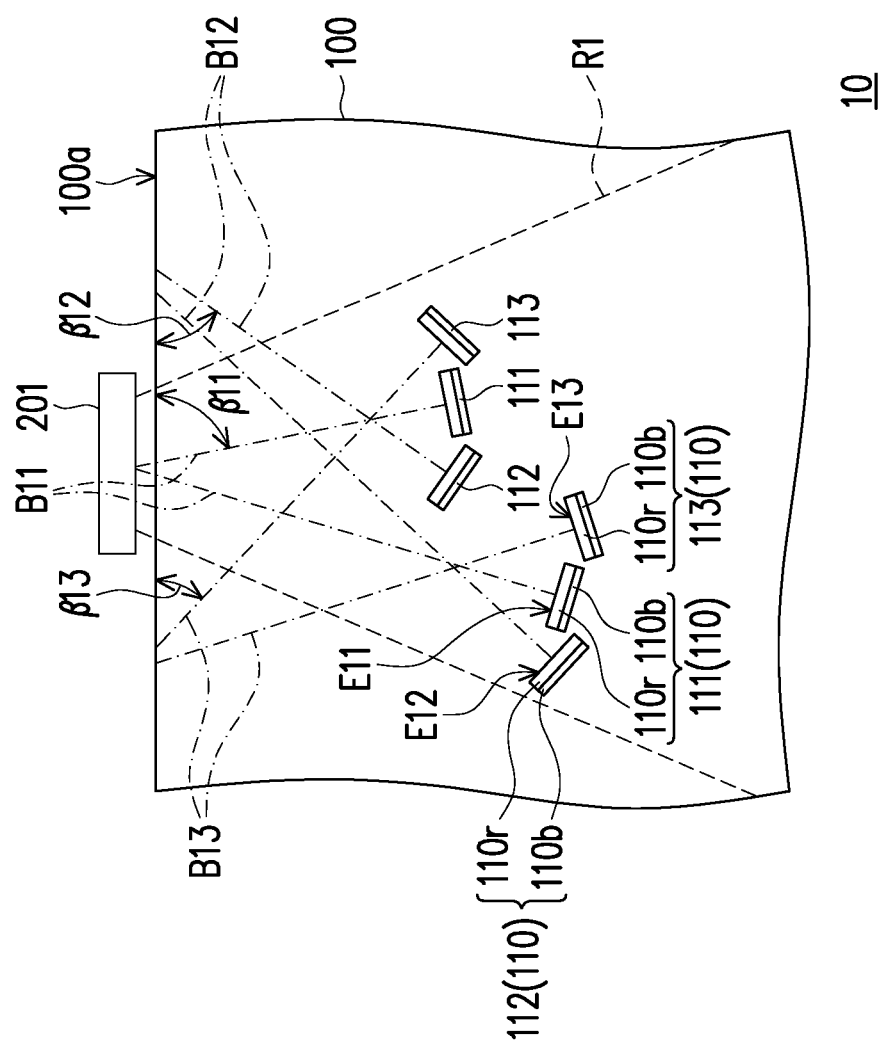
FIG. 2A and FIG. 2B are enlarged schematic views of two partial areas of the light source module in FIG. 1.
Figure 2B:
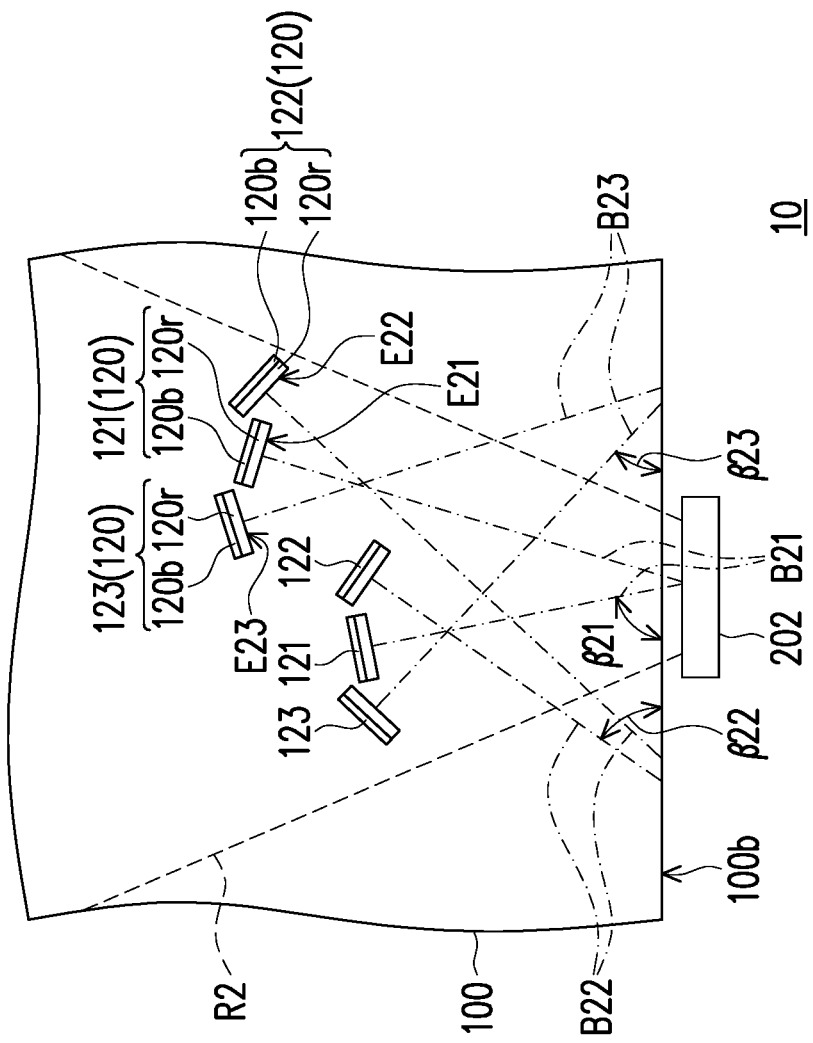
Figure 3:
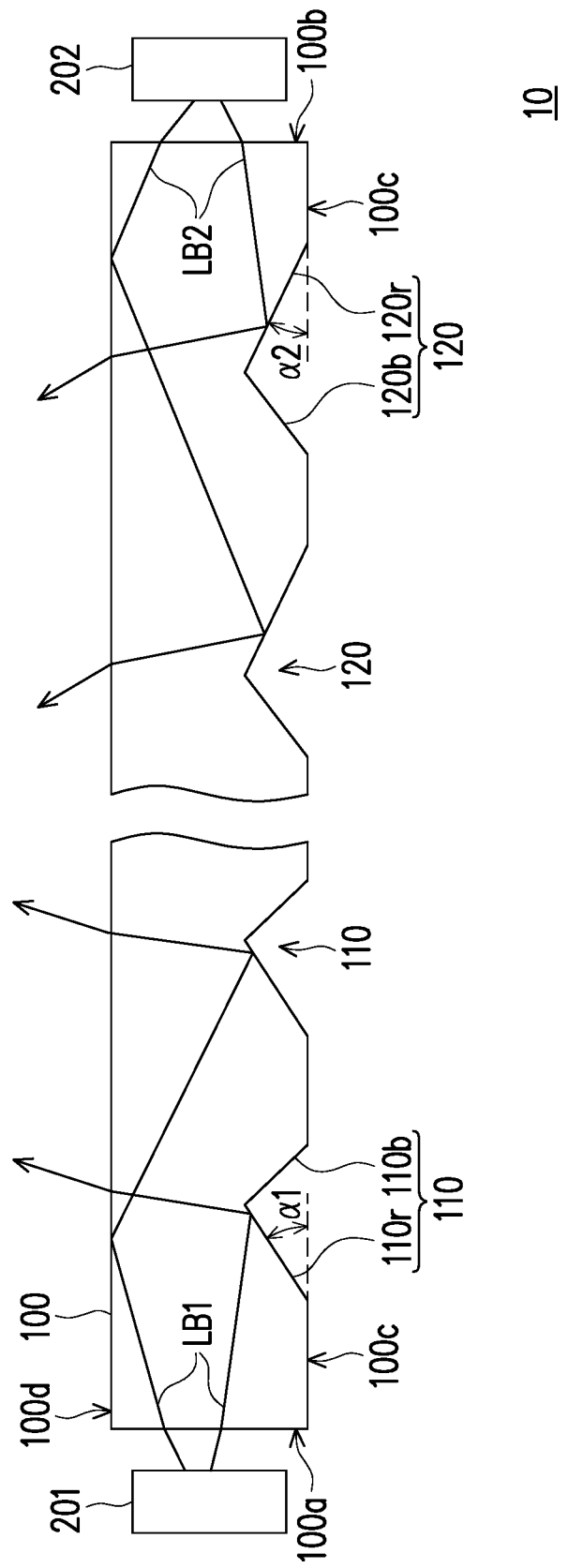
FIG. 3 is a schematic cross-sectional view of the light source module in FIG. 1.

FIG. 1 is a schematic front view of a light source module according to the first embodiment of the disclosure. FIG. 2A and FIG. 2B are enlarged schematic views of two partial areas of the light source module in FIG. 1. FIG. 3 is a schematic cross-sectional view of the light source module in FIG. 1. It is worth mentioning that, for the sake of clarity in presentation and description, FIG. 2A and FIG. 2B only show partial optical microstructures. With reference to FIG. 1 to FIG. 3, a light source module 10 includes a light guide plate 100, a first light source 201, and a second light source 202. The light source module 10 is, for example, a decorative light panel (or display) that displays patterns or text. The light guide plate 100 has a first light incident surface 100a and a second light incident surface 100b that are opposite each other, and a bottom surface 100c and a light emitting surface 100d that are opposite each other. The bottom surface 100c and the light emitting surface 100d are each connected between the first light incident surface 100a and the second light incident surface 100b. In this embodiment, the first light source 201 and the second light source 202 may be point light sources, or may individually be composed of a single light emitting diode (LED). The material of the light guide plate 100 includes polycarbonate (PC), polymethyl methacrylate (PMMA), glass, or other resin materials with high light transmittance.

The first light source 201 and the second light source 202 are respectively disposed on a side of a first light incident surface 100a and a side of a second light incident surface 100b of the light guide plate 100. In this embodiment, the light guide plate 100 has a first light emitting region R1 and a second light emitting region R2, but it is not limited thereto. The first light source 201 is configured to emit a plurality of first light beams LB1 toward the first light incident surface 100a of the light guide plate 100, and these first light beams LB1 are transmitted within the range of the first light emitting region R1 of the light guide plate 100 and are emitted from the light guide plate 100 through the light emitting surface 100d. The second light source 202 is configured to emit a plurality of second light beams LB2 toward the second light incident surface 100b of the light guide plate 100, and these second light beams LB2 are transmitted within the range of the second light emitting region R2 of the light guide plate 100 and are emitted from the light guide plate 100 through the light emitting surface 100d.

From another point of view, the transmission path of these first light beams LB1 emitted by the first light source 201 within the light guide plate 100 may define the first light emitting region R1 of the light guide plate 100, and the transmission path of the second light beams LB2 emitted by the second light source 202 within the light guide plate 100 may define the second light emitting region R2 of the light guide plate 100. In this embodiment, the orthographic projection of the first light emitting region R1 of the light guide plate 100 on the light emitting surface 100d is not overlapped with the orthographic projection of the second light emitting region R2 on the light emitting surface 100d. That is to say, the first light beams LB1 that are from the first light source 201 and are transmitted within the light guide plate 100 do not intersect the second light beams LB2 that are from the second light source 202 and are transmitted within the light guide plate 100. However, the disclosure is not limited thereto. According to other embodiments, the first light emitting region R1 of the light guide plate may also be partially overlapped with the second light emitting region R2. For example, an area of an overlapping region between the first light emitting region R1 and the second light emitting region R2 may be less than 10% of an area of the first light emitting region R1 (for image uniformity).

It is worth mentioning that, when describing that the first light beams LB1 do not intersect the second light beams LB2, this description does not include unexpected reflection or diffuse reflection generated among the light beams.

In this embodiment, an included angle θ1 between each of the first light beams LB1 after entering the light guide plate 100 and the normal direction of the first light incident surface 100a, and an included angle θ2 between each of the second light beams LB2 after entering the light guide plate 100 and the normal direction of the second light incident surface 100b are both less than or equal to 40 degrees, but they are not limited thereto. It is noteworthy that a range value of opening angle of the first light beams LB1 in the light guide plate 100 is substantially equal to a range value of opening angle of the second light beams LB2 in the light guide plate 100 (e.g., 80 degrees). Accordingly, the densest arrangement of the first light emitting region R1 and the second light emitting region R2 can be realized, which helps to improve the overall uniformity of the light source module 10.

Furthermore, the light source module 10 also includes a plurality of first optical microstructures 110 (as shown in FIG. 2A) and a plurality of second optical microstructures 120 (as shown in FIG. 2B) disposed on the bottom surface 100c of the light guide plate 100. The first optical microstructures 110 and the second optical microstructures 120 are respectively disposed in the first light emitting region R1 and the second light emitting region R2 of the light guide plate 100. The first optical microstructures 110 (or the second optical microstructures 120) may be selectively divided into a plurality of parts, and these parts respectively form a plurality of patterns or text on the light guide plate 100.

For example, in this embodiment, a first part of the first optical microstructures 110 may be formed of a plurality of first optical microstructures 111, a second part of the first optical microstructures 110 may be formed of a plurality of first optical microstructure 112, and a third part of the first optical microstructures 110 may be formed of a plurality of first optical microstructures 113. The first optical microstructures 111, the first optical microstructures 112, and the first optical microstructures 113 may respectively form a first pattern IM11, a second pattern IM12, and a third pattern IM13 that partially overlap each other. Similarly, a first part of the second optical microstructures 120 may be formed of a plurality of second optical microstructures 121, a second part of the second optical microstructures 120 may be formed of a plurality of second optical microstructures 122, and a third part of the second optical microstructures 120 may be formed of a plurality of second optical microstructures 123. The second optical microstructures 121, the second optical microstructures 122, and the second optical microstructures 123 may respectively form a first pattern IM21, a second pattern IM22, and a third pattern IM23 that partially overlap each other.

It is worth mentioning that the patterns formed of the optical microstructures are, for example, patterns of objects at different view angles. In addition, the first pattern IM11, the second pattern IM12, and the third pattern IM13 (or the first pattern IM21, the second pattern IM22, and the third pattern IM23) are visible to a viewer at positions that are different from each other. Therefore, when two eyes of the viewer respectively see the first pattern IM11 and the second pattern IM12 (or the first pattern IM11 and the third pattern IM13), a stereoscopic vision with a sense of depth is generated.

For example, since the light beam reflected by the first optical microstructure 110 has high directivity, therefore at the same viewing position, the left eye of the viewer sees only one pattern of the first pattern IM11, the second pattern IM12, and the third pattern IM13, and the right eye sees only another pattern of the first pattern IM11, the second pattern IM12, and the third pattern IM13. For example, when the viewer stands at a position in front of the light source module 10 (i.e., a side of the light emitting surface 100d of the light guide plate 100), a portion of the first light beams LB1 is reflected by the first optical microstructures 111 and then transmitted to the left eye of the viewer to present the first pattern IM11, and another portion of the first light beams LB1 is reflected by the first optical microstructures 112 and then transmitted to the right eye of the viewer to present the second pattern IM12. At this time, the viewer will have a stereoscopic vision at a specific view angle.

Next, when the viewer (stands at the position in front of the light source module 10) moves to another position in a lateral direction (e.g., in a horizontal direction in FIG. 1), the portion of the first light beams LB1 is reflected by the first optical microstructures 111 and then transmitted to the right eye of the viewer to present the first pattern IM11, and yet another portion of the first light beams LB1 is reflected by the first optical microstructures 113 and then transmitted to the left eye of the viewer to present the third pattern IM13. At this time, the viewer will have a stereoscopic vision at another specific view angle. In this way, a sense of dynamic parallax on a three-dimensional image that is generated by the viewer when moving can be developed.

To reflect the light beam transmitted within the light guide plate 100 toward the light emitting surface 100d, each of the first optical microstructures 110 has a first light receiving surface 110r and a first backlight surface 110b that are connected with each other, and the first light receiving surfaces 110r of the first optical microstructures 110 are all disposed facing the first light source 201. Similarly, each of the second optical microstructures 120 has a second light receiving surface 120r and a second backlight surface 120b that are connected with each other, and the second light receiving surfaces 120r of the second optical microstructures 120 are all disposed facing the second light source 202. It is worth mentioning that the light receiving surface disposed facing the light source means that a perpendicular bisector of the intersecting line between the light receiving surface and the bottom surface 100c is directed toward the vicinity of the light source; the vicinity of the light source, for example, refers to the light source and the area of 2 times the width of the light source extending from the light source toward the left and toward the right, or the range of 5 mm extending from the center of the light source toward the left and toward the right.

In this embodiment, the first optical microstructure 110 and the second optical microstructure 120 may each be a groove structure recessed from the bottom surface 100c of the light guide plate 100, and the orthographic projection profile of the area occupied by the groove structure on the light emitting surface 100d may be rectangular, but it is not limited thereto. Therefore, the light guide plate 100 defines one surface between the two surfaces of the first optical microstructure 110 that is closer to the first light source 201 as the first light receiving surface 110r of the first optical microstructure 110, and defines the other surface, which is farther away from the first light source 201, as the first backlight surface 110b of the first optical microstructure 110. Likewise, the light guide plate 100 defines one surface between the two surfaces of the second optical microstructure 120 that is closer to the second light source 202 as the second light receiving surface 120r of the second optical microstructure 120, and defines the other surface, which is farther away from the second light source 202, as the second backlight surface 120b of the second optical microstructure 120.

Furthermore, with reference to FIG. 3, a first angle α1 is present between the first light receiving surface 110r of the first optical microstructure 110 and the bottom surface 100c, a second angle α2 is present between the second light receiving surface 120r of the second optical microstructure 120 and the bottom surface 100c, and the first angle α1 and the second angle α2 fall within a range between 35 degrees and 55 degrees. In this embodiment, the first angle α1 between the first light receiving surface 110r and the bottom surface 100c may be selectively different from the second angle α2 between the second light receiving surface 120r and the bottom surface 100c, and the vertical height (e.g., from the ground) of a light emitting range of the emitting first light beam LB1 (emitted from the light guide plate 100 through the light emitting surface 100d) may be adjusted to be the same as or similar to the vertical height of a light emitting range of the emitting second light beam LB2. Nonetheless, the disclosure is not limited thereto. Accordingly, the three-dimensional image generated by the first light beams LB1 reflected by the first optical microstructures 110 and the three-dimensional image generated by the second light beams LB2 reflected by the second optical microstructures 120 can be respectively imaged at different depths for the viewer, to realize three-dimensional display with different depths of field. It is worth mentioning that the included angle between the first backlight surface 110b and of the first optical microstructure 110 the bottom surface 100c, for example, is from 70 degrees to 90 degrees, and the included angle between the second backlight surface 120b of the second optical microstructure 120 and the bottom surface 100c, for example, is from 70 degrees to 90 degrees. Nonetheless, the disclosure is not limited thereto.

On the other hand, the first light receiving surfaces 110r of the first optical microstructures 111 (i.e., the first part of the first optical microstructures 110) each have an edge E11 at a junction with the bottom surface 100c, and an included angle β11 is present between a perpendicular bisector B11 of the edge E11 of each first optical microstructure 111 and the first light incident surface 100a. The first light receiving surfaces 110r of the first optical microstructures 112 (i.e., the second part of the first optical microstructures 110) each have an edge E12 at a junction with the bottom surface 100c, and an included angle β12 is present between a perpendicular bisector B12 of the edge E12 of each first optical microstructure 112 and the first light incident surface 100a. The first light receiving surfaces 110r of the first optical microstructures 113 (i.e., the third part of the first optical microstructures 110) each have an edge E13 at a junction with the bottom surface 100c, and an included angle β13 is present between a perpendicular bisector B13 of the edge E13 of each first optical microstructure 113 and the first light incident surface 100a.

Similarly, the second light receiving surfaces 120r of the second optical microstructures 121 (i.e., the first part of the second optical microstructures 120) each have an edge E21 at a junction with the bottom surface 100c, and an included angle β21 is present between a perpendicular bisector B21 of the edge E21 of each second optical microstructure 121 and the second light incident surface 100b. The second light receiving surfaces 120r of the second optical microstructures 122 (i.e., the second part of the second optical microstructures 120) each have an edge E22 at a junction with the bottom surface 100c, and an included angle β22 is present between a perpendicular bisector B22 of the edge E22 of each second optical microstructure 122 and the second light incident surface 100b. The second light receiving surfaces 120r of the second optical microstructures 123 (i.e., the third part of the second optical microstructures 120) each have an edge E23 at a junction with the bottom surface 100c, and an included angle β23 is present between a perpendicular bisector B23 of the edge E23 of each second optical microstructure 123 and the second light incident surface 100b.

For example, the included angle β11 of the first optical microstructure 111, the included angle β12 of the first optical microstructure 112, and the included angle β13 of the first optical microstructure 113, the included angle β21 of the second optical microstructure 121, the included angle β22 of the second optical microstructure 122, and the included angle β23 of the second optical microstructure 123 may be 90 degrees or fall within a range between 45 degrees and 90 degrees.

To present the patterns formed of the optical microstructures onto different view angles of the viewing space (i.e., the space on a side of the light emitting surface 100d of the light guide plate 100), the included angles between the perpendicular bisectors of the light receiving surfaces of the optical microstructures and the light incident surfaces of the light guide plate 100 (i.e., β11, β12, β13, β21, β22, β23) are all different. It is noteworthy that in this embodiment, the perpendicular bisector B11 of the edge E11 of each first optical microstructure 111 passes through the first light source 201, and the perpendicular bisector B21 of the edge E21 of each second optical microstructure 121 passes through the second light source 202. Nonetheless, the disclosure is not limited thereto. In other embodiments, whether the vertical bisector of the edge at the junction between the light receiving surface of the optical microstructure and the bottom surface passes through the light source may be determined depending on actual application requirements (e.g., the relative positional relationship between the viewing space and the light source module).

In this embodiment, an angle difference between the included angle β11 and the included angle β12 of the first optical microstructure 111 and the first optical microstructure 112 that are adjacent (or an angle difference between the included angle β11 and the included angle (313 of the first optical microstructure 111 and the first optical microstructure 113 that are adjacent) may be selectively larger than an angle difference between the included angle β21 and the included angle β22 of the second optical microstructure 121 and the second optical microstructure 122 that are adjacent (or an angle difference between the included angle β21 and the included angle β23 of the second optical microstructure 121 and the second optical microstructure 123 that are adjacent). Accordingly, when the viewer moves between different view angles (view positions), the sense of dynamic parallax generated by the three-dimensional image formed of the first optical microstructures 110 is lower than the sense of dynamic parallax generated by the three-dimensional image formed of the second optical microstructures 120. In other words, the viewer would think that the position of the three-dimensional image formed of the first optical microstructures 110 is farther than the position of the three-dimensional image generated by the second optical microstructures 120, which helps to further enhance the visual experience of the viewer on the three-dimensional image.

However, the disclosure is not limited thereto. According to other embodiments, the angle difference between the included angle β11 and the included angle β12 of the first optical microstructure 111 and the first optical microstructure 112 that are adjacent (or the angle difference between the included angle β11 and the included angle β13 of the first optical microstructure 111 and the first optical microstructure 113 that are adjacent) may as well be substantially equal to the angle difference between the included angle β21 and the included angle 322 of the second optical microstructure 121 and the second optical microstructure 122 that are adjacent (or the angle difference between the included angle β21 and the included angle β23 of the second optical microstructure 121 and the second optical microstructure 123 that are adjacent).

Several other embodiments will be listed hereinafter to describe the disclosure in detail, in which the same components will be annotated with the same reference numerals, and the description of the same technical content will be omitted. For the omitted parts, reference may be made to the foregoing embodiment, and will not be repeatedly described hereinafter.

Figure 4:
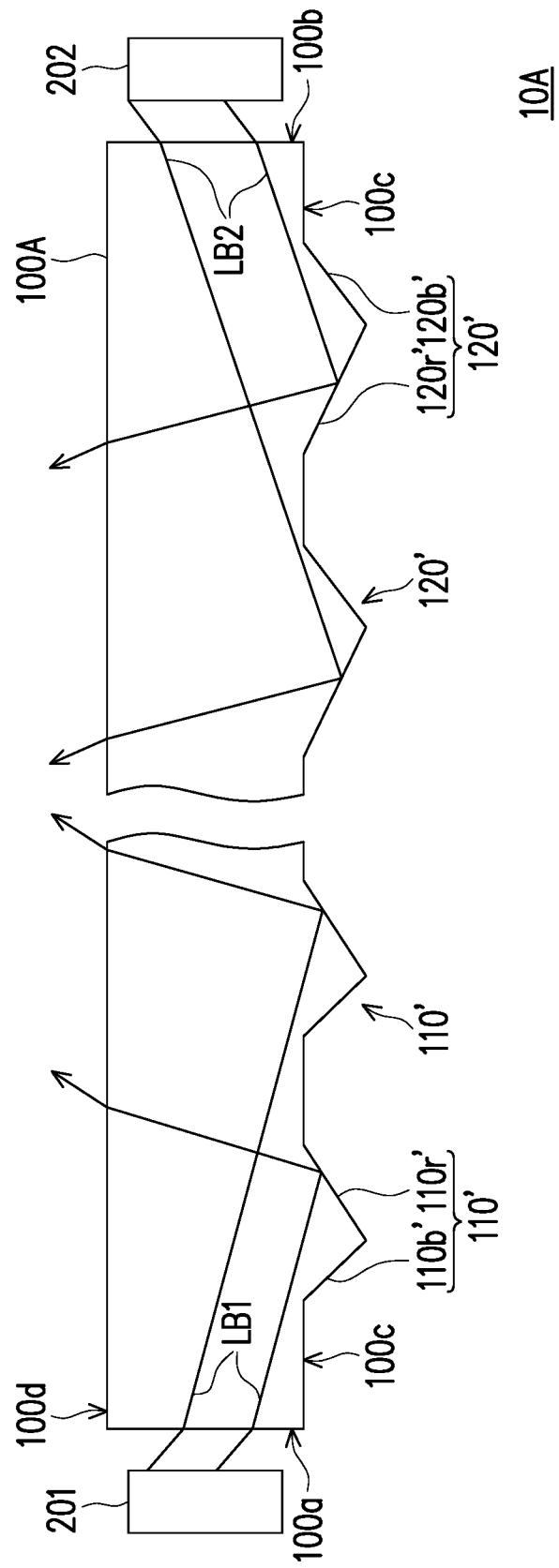
FIG. 4 is a schematic cross-sectional view of a light source module according to the second embodiment of the disclosure.

FIG. 4 is a schematic cross-sectional view of a light source module according to the second embodiment of the disclosure. With reference to FIG. 4, the difference between a light source module 10A of this embodiment and the light source module 10 of FIG. 3 lies in that the configuration of the optical microstructure on the light guide plate is different.

In this embodiment, a first optical microstructure 110' and a second optical microstructure 120' may be protruding structures that protrude from the bottom surface 100c of a light guide plate 100A. Therefore, the light guide plate 100A defines one surface between two surfaces of the first optical microstructure 110' that is farther from the first light source 201 as a first light receiving surface 110f of the first optical microstructure 110', and defines the other surface, which is closer to the first light source 201, as a first backlight surface 110b' of the first optical microstructure 110'. Likewise, the light guide plate 100A defines one surface between two surfaces of the second optical microstructure 120' that is farther from the second light source 202 as a second light receiving surface 120r' of the second optical microstructure 120', and defines the other surface, which is closer to the second light source 202, as a second backlight surface 120b' of the second optical microstructure 120'.

Figure 5:
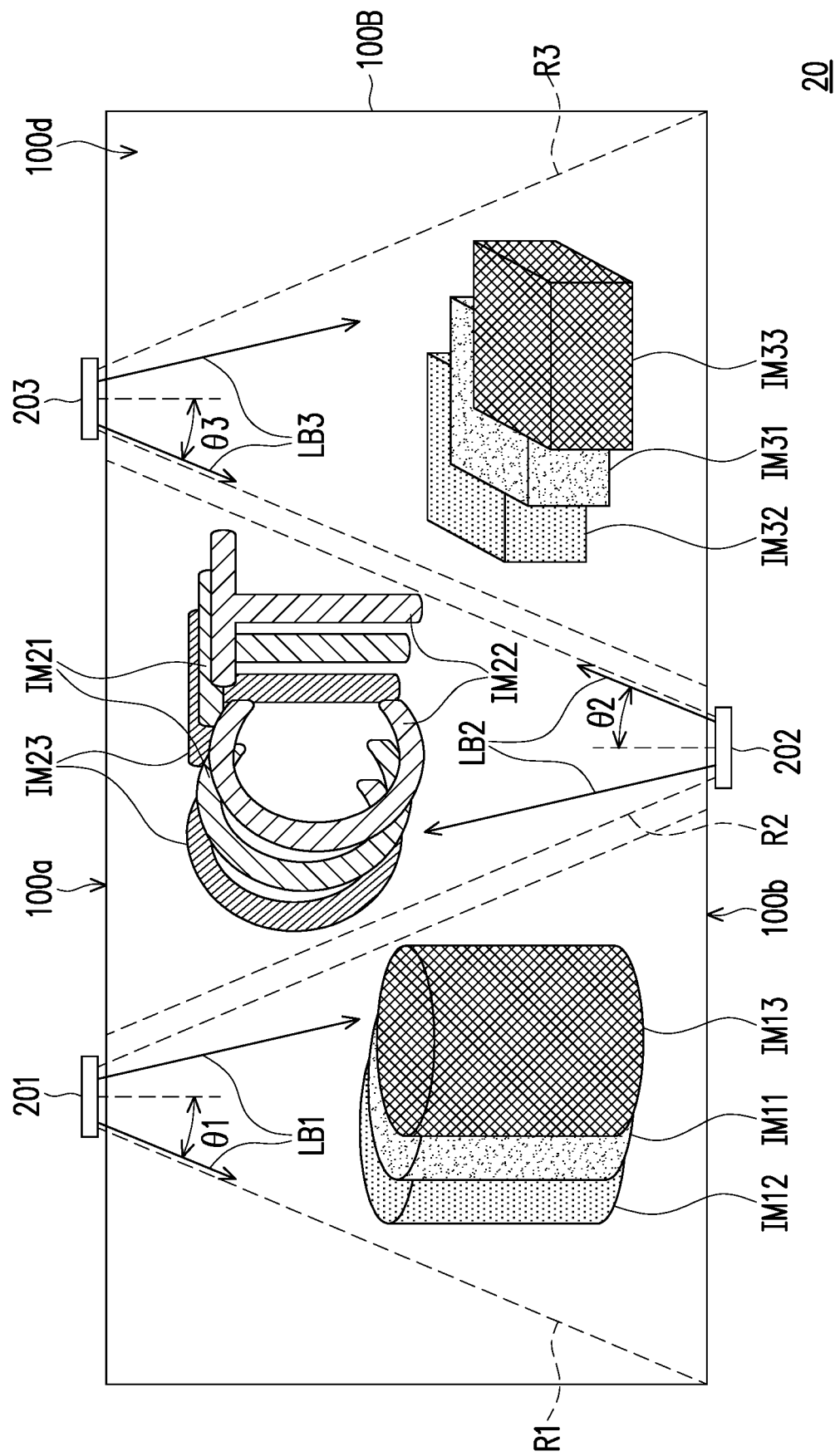
FIG. 5 is a schematic front view of a light source module according to the third embodiment of the disclosure.
Figure 6:
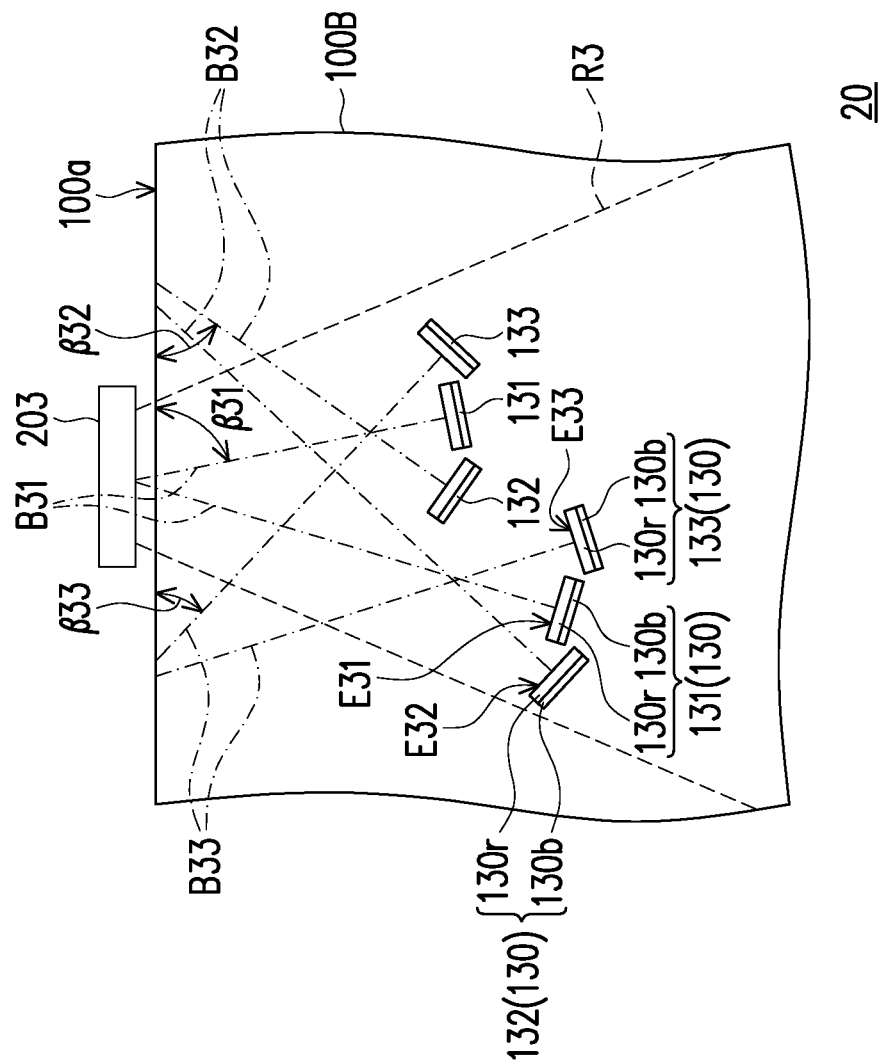
FIG. 6 is an enlarged schematic view of a partial area of the light source module in FIG. 5.
Figure 7:
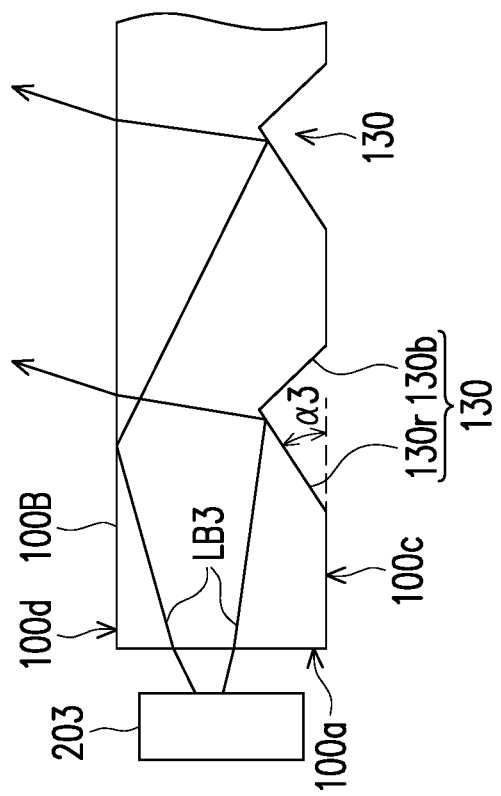
FIG. 7 is a schematic cross-sectional view of the partial area of the light source module in FIG. 5.

FIG. 5 is a schematic front view of a light source module according to the third embodiment of the disclosure. FIG. 6 is an enlarged schematic view of a partial area of the light source module in FIG. 5. FIG. 7 is a schematic cross-sectional view of the partial area of the light source module in FIG. 5. It is worth mentioning that, for the sake of clarity in presentation and description, FIG. 5 omits the illustration of optical microstructure in FIG. 6.

With reference to FIG. 5 to FIG. 7, the difference between a light source module 20 of this embodiment and the light source module 10 of FIG. 1 lies in that the number of light sources is different and that the number of optical microstructures is different. Specifically, to present a light emitting region larger than the light emitting region of the light source module 10, the light source module 20 further includes a third light source 203, and the third light source 203 is disposed on a side of the first light incident surface 100a of a light guide plate 100B. Notably, in an arrangement direction (i.e., a horizontal direction in FIG. 5) of the first light source 201 and the third light source 203, the second light source 202 is located between the first light source 201 and the third light source 203.

In this embodiment, the light guide plate 100B also has a third light emitting region R3. Similar to the first light source 201, the third light source 203 is configured to emit a plurality of third light beams LB3 toward the first light incident surface 100a of the light guide plate 100B, and these third light beams LB3 are transmitted within the light guide plate 100B and are emitted from the light guide plate 100B through a part of the light emitting surface 100d located in the third light emitting region R3. From another point of view, the transmission path of the third light beams LB3 emitted by the third light source 203 within the light guide plate 100B may define the third light emitting region R3 of the light guide plate 100B. Specifically, the second light emitting region R2 is located between the first light emitting region R1 and the third light emitting region R3.

Notably, the orthographic projection of the third light emitting region R3 of the light guide plate 100B on the light emitting surface 100d is not overlapped with the orthographic projection of the second light emitting region R2 on the light emitting surface 100d. That is to say, the third light beams LB3 that are from the third light source 203 and are transmitted within the light guide plate 100B do not intersect the second light beam LB2 that are from the second light source 202 and are transmitted within the light guide plate 100B. Nonetheless, the disclosure is not limited thereto. According to other embodiments, the third light emitting region R3 of the light guide plate may also be partially overlapped with the second light emitting region R2. For example, an area of an overlapping region between the second light emitting region R2 and the third light emitting region R3 is less than 10% of an area of the second light emitting region R2. It is worth mentioning that, when describing that the third light beams LB3 do not intersect the second light beams LB2, this description does not include unexpected reflection or diffuse reflection generated among the light beams.

In this embodiment, an included angle θ3 between each of the third light beams LB3 after entering the light guide plate 100B and the normal direction of the first light incident surface 100a is also less than or equal to 40 degrees, but it is not limited thereto. It is noteworthy that a range value of opening angle (e.g., 80 degrees) of the third light beams LB3 in the light guide plate 100B is substantially equal to the range value of opening angle of the first light beams LB1 and the second light beams LB2 in the light guide plate 100B. Accordingly, the densest arrangement of the first light emitting region R1, the second light emitting region R2, and the third light emitting region R3 can be realized, which helps to improve the overall image brightness and emitting light uniformity of the light source module 20. From another point of view, by such light source configuration, the design flexibility in the size of the light source module can be increased, such as a light source module that is capable of displaying a large-size (three-dimensional) image.

Furthermore, the light source module 20 further includes a plurality of third optical microstructures 130 disposed on the bottom surface 100c of the light guide plate 100, and these third optical microstructures 130 are disposed in the third light emitting region R3 of the light guide plate 100B. Similar to the first optical microstructures 110 and the second optical microstructures 120, the third optical microstructures 130 may also be selectively divided into a plurality of parts, and these parts respectively form a plurality of patterns on the light guide plate 100B. For example, a first part of the third optical microstructures 130 may be formed of a plurality of third optical microstructures 131, a second part may be formed of a plurality of third optical microstructures 132, and a third part may be formed of a plurality of third optical microstructures 133. The third optical microstructures 131, the third optical microstructures 132, and the third optical microstructures 133 may respectively form a first pattern IM31, a second pattern IM32, and a third pattern IM33 that partially overlap each other.

Similar to the first optical microstructures 110 and the second optical microstructures 120, the first pattern IM31, the second pattern IM32, and the third pattern IM33 formed of the third optical microstructures 130 are visible to the viewer at positions that are different from each other. Therefore, when the two eyes of the viewer respectively see the first pattern IM31 and the second pattern IM32 (or the first pattern IM31 and the third pattern IM33), a stereoscopic vision with a sense of depth is generated.

To reflect the third light beam LB3 transmitted within the light guide plate 100B toward the light emitting surface 100d, each of these third optical microstructures 130 has a third light receiving surface 130r and a third backlight surface 130b that are connected with each other, and the third light receiving surfaces 130r of the third optical microstructure 130 are all disposed facing the third light source 203. In this embodiment, the third optical microstructure 130 may be a groove structure recessed from the bottom surface 100c of the light guide plate 100B, and the orthographic projection profile of the area occupied by the groove structure on the light emitting surface 100d may be rectangular, but it is not limited thereto. Therefore, the light guide plate 100B defines one surface between the two surfaces of the third optical microstructure 130 that is closer to the third light source 203 as the third light receiving surface 130r of the third optical microstructure 130, and defines the other surface, which is farther away from the third light source 203, as the third backlight surface 130b of the third optical microstructure 130.

Furthermore, with reference to FIG. 3, FIG. 5, and FIG. 7 at the same time, a third angle α3 is present between the third light receiving surface 130r of the third optical microstructure 130 and the bottom surface 100c, and the third angle α3 falls within a range between 35 degrees and 55 degrees. In this embodiment, the first angle α1 of the first optical microstructure 110, the second angle α2 of the second optical microstructure 120, and the third angle α3 of the third optical microstructure 130 are different from each other, but they are not limited thereto. In other embodiments, the first angle α1 of the first optical microstructure 110 is different from the second angle α2 of the second optical microstructure 120, and the first angle α1 of the first optical microstructure 110 is the same as the third angle α3 of the third optical microstructure 130. Accordingly, the three-dimensional image generated by the first light beams LB1 reflected by the first optical microstructures 110, the three-dimensional image generated by the second light beams LB2 reflected by the second optical microstructures 120, and the three-dimensional image generated by the third light beams LB3 reflected by the third optical microstructures 130 can be respectively imaged at different depths for the viewer, to realize three-dimensional display with different depths of field.

On the other hand, the third light receiving surfaces 130r of the third optical microstructures 131 (i.e., the first part of the third optical microstructures 130) each have an edge E31 at a junction with the bottom surface 100c, and an included angle β31 is present between a perpendicular bisector B31 of the edge E31 of each third optical microstructure 131 and the first light incident surface 100a. The third light receiving surfaces 130r of the third optical microstructures 132 (i.e., the second part of the third optical microstructures 130) each have an edge E32 at a junction with the bottom surface 100c, and an included angle β32 is present between a perpendicular bisector B32 of the edge E32 of each third optical microstructure 132 and the first light incident surface 100a. The third light receiving surfaces 130r of the third optical microstructures 133 (i.e., the third part of the third optical microstructures 130) have an edge E33 at a junction with the bottom surface 100c, and an included angle β33 is present between a perpendicular bisector B33 of the edge E33 of each third optical microstructure 133 and the first light incident surface 100a. For example, the included angle β31 of the third optical microstructure 131, the included angle β32 of the third optical microstructure 132, and the included angle β33 of the third optical microstructure 133 may fall within a range between 45 degrees and 90 degrees.

It is noteworthy that in this embodiment, the perpendicular bisector B31 of the edge E31 of each third optical microstructure 131 passes through the third light source 203, but the disclosure is not limited thereto. In other embodiments, whether the vertical bisector of the edge at the junction between the light receiving surface of the optical microstructure and the bottom surface passes through the light source may be determined depending on actual application requirements (e.g., the relative positional relationship between the viewing space and the light source module). Since the configuration relationship between the third optical microstructures 130, the first light incident surface 100a, and the third light source 203 is similar to the above-mentioned configuration relationship between the first optical microstructures 110, the first light incident surface 100a, and the first light source 201, reference may therefore be made to the above-mentioned relevant paragraphs for detailed description, which will not be repeated herein.

Figure 8:
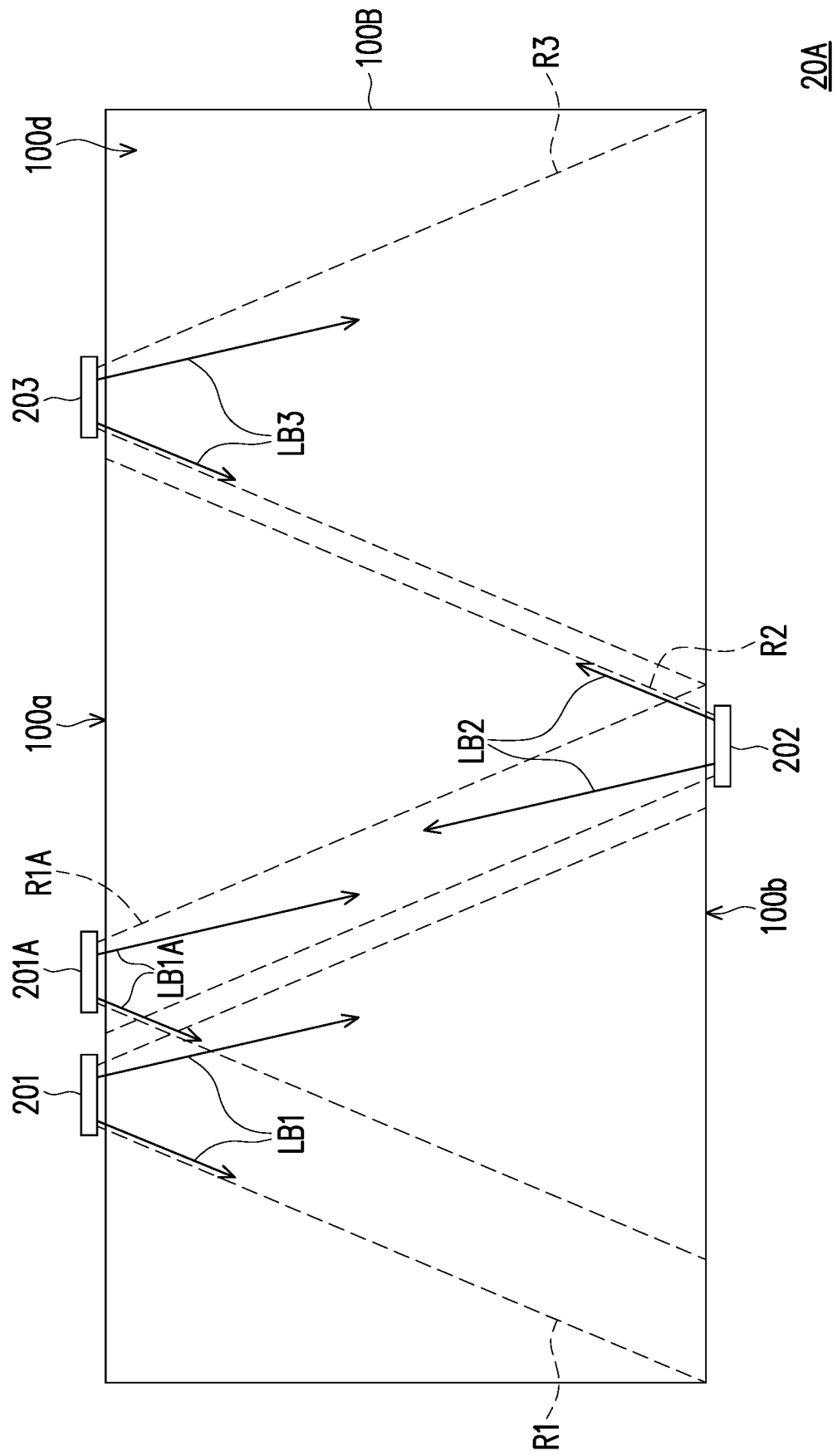
FIG. 8 is a schematic front view of a light source module according to the fourth embodiment of the disclosure.
Figure 9:
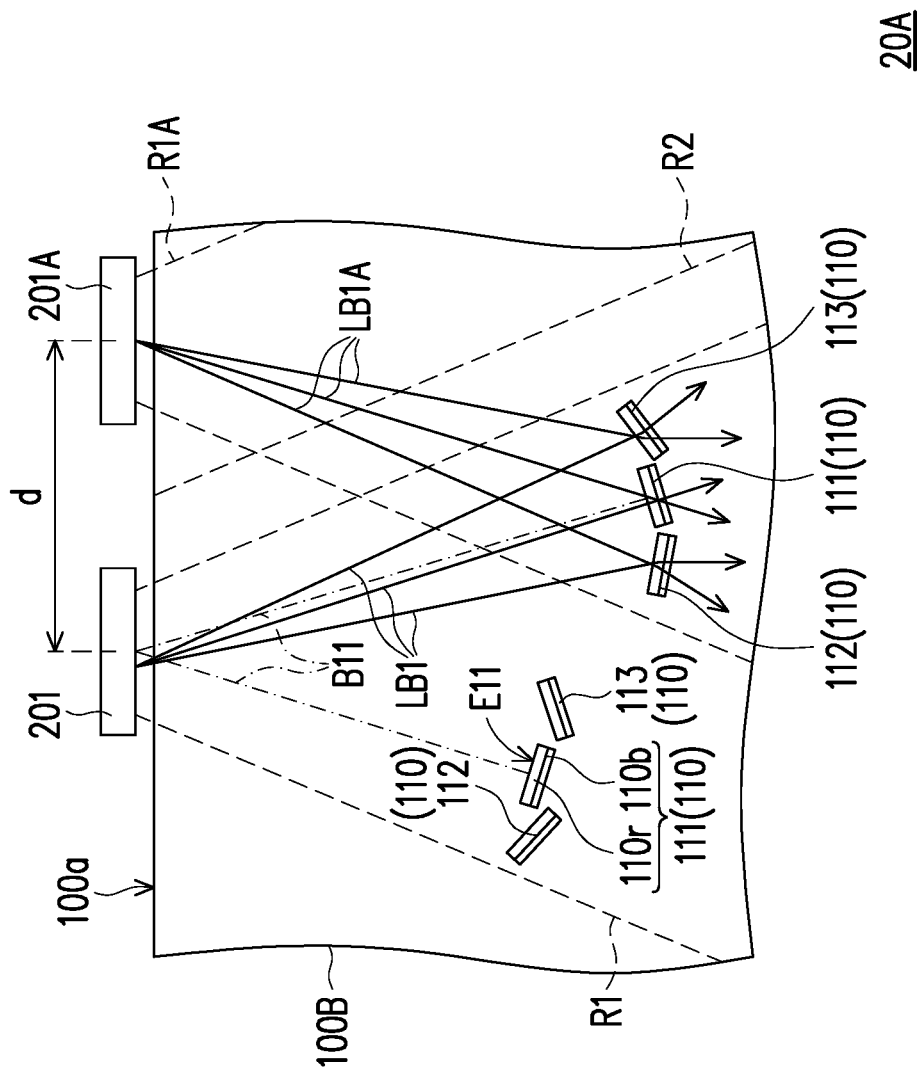
FIG. 9 is an enlarged schematic view of a partial area of the light source module in FIG. 8.

FIG. 8 is a schematic front view of a light source module according to the fourth embodiment of the disclosure. FIG. 9 is an enlarged schematic view of a partial area of the light source module in FIG. 8. It is worth mentioning that, for the sake of clarity in presentation and description, FIG. 8 omits the illustration of optical microstructures in FIG. 9. With reference to FIG. 8 and FIG. 9, the difference between a light source module 20A of this embodiment and the light source module 20 of FIG. 5 lies in that the configuration of the light source of the light source module is different. Specifically, the light source module 20A further includes a first auxiliary light source 201A, which is disposed on a side of the first light incident surface 100a of the light guide plate 100B and is located on one side of the first light source 201.

For example, in the arrangement direction (e.g. a horizontal direction in FIG. 8) of the first light source 201 and the third light source 203, the first auxiliary light source 201A is located between the first light source 201 and the second light source 202, but is not limited thereto. In other embodiments, the first auxiliary light source 201A may as well be disposed on the side of the first light source 201 that is away from the third light source 203. In yet another embodiment, auxiliary light sources may be provided on each side of the first light source 201. In this embodiment, a distance d between the first auxiliary light source 201A and the first light source 201, for example, is less than 80 mm, less than 40 mm, or between 20 mm and 30 mm, and the distance d is defined by the distance between the geometric center of the first auxiliary light source 201A and the geometric center of the first light source 201. It is worth mentioning that, in the above-mentioned different embodiments, the number of auxiliary light sources disposed on each side (or one single side) may as well be two of more. For example, when the number of auxiliary light sources on the same side of the first light source 201 is two, the distance between one of them and the first light source 201 may be less than 40 mm, and the distance between the other and the first light source 201 may be less than 60 mm. Nonetheless, the disclosure is not limited thereto.

In this embodiment, the light guide plate 100B also has a first auxiliary light emitting region R1A. The first auxiliary light source 201A is configured to emit a plurality of first auxiliary light beams LB1A toward the first light incident surface 100a of the light guide plate 100B, and these first auxiliary light beams LB1A are transmitted within the light guide plate 100B and are emitted from the light guide plate 100B through the part of the light emitting surface 100d located in the first auxiliary light emitting region R1A. From another point of view, the transmission path of the first auxiliary light beams LB1A emitted by the first auxiliary light source 201A within the light guide plate 100B may define the first auxiliary light emitting region R1A of the light guide plate 100B.

It should be noted that the orthographic projection of the first auxiliary light emitting region R1A of the light guide plate 100B on the light emitting surface 100d is partially overlapped with the orthographic projections of the first light emitting region R1 and the second light emitting region R2 on the light emitting surface 100d. Furthermore, an overlapping region between the first auxiliary light emitting region R1A and the first light emitting region R1 on the light emitting surface 100d is larger than an overlapping region between the first auxiliary light emitting region R1A and the second light emitting region R2 on the light emitting surface 100d. That is to say, the first auxiliary light beams LB1A that are from the first auxiliary light source 201A and are transmitted within the light guide plate 100B intersect the first light beams LB1 that are from the first light source 201 and are transmitted within the light guide plate 100B and the second light beams LB2 that are from the second light source 202 and are transmitted within the light guide plate 100B. More specifically, the orthographic projection of the first auxiliary light emitting region R1A of the light guide plate 100B on the light emitting surface 100d is substantially overlapped with the orthographic projection of the first light emitting region R1 on the light emitting surface 100d.

It is worth mentioning that, with further reference to FIG. 9, the first auxiliary light beams LB1A, after being reflected by the first light receiving surfaces 110r of the first optical microstructures 110, will be transmitted toward the viewing space at a larger view angle. That is to say, through the configuration of the first auxiliary light source 201A, the viewer can see the patterns (e.g., the first pattern IM11, the second pattern IM12, and the third pattern IM13 in FIG. 1) formed of the first optical microstructures 110 in a larger range of view angle, which helps to improve the adaptability of the light source module 20A to different application scenarios.

It should be noted that in this embodiment, although the number of auxiliary light source is one as an example for exemplary description, this does not mean that the disclosure is limited to the content disclosed in the drawings. In other embodiments, depending on actual application requirements (e.g., a visible range of the image), the number of auxiliary light sources may be adjusted to be a plurality of auxiliary light sources, which are respectively located on two adjacent sides of a plurality of light sources.

Figure 10:
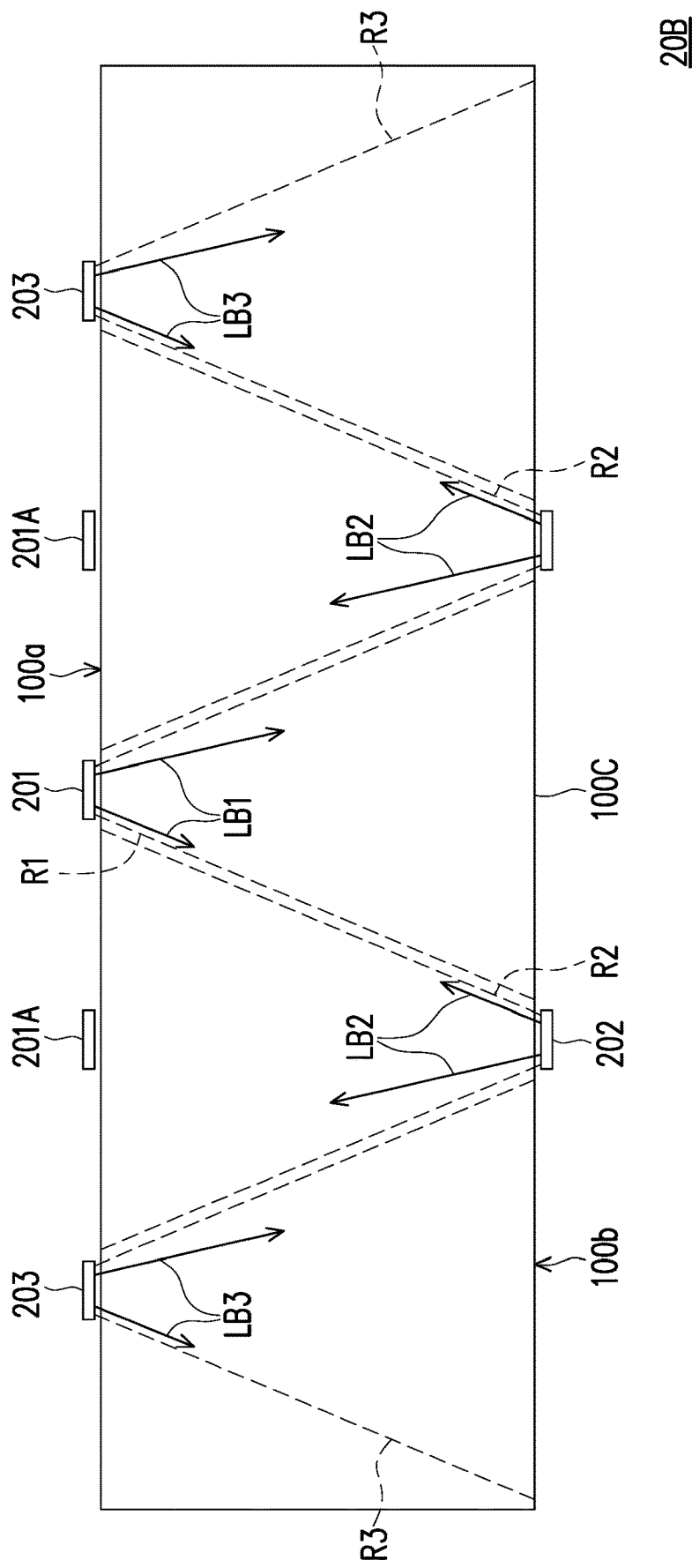
FIG. 10 is a schematic front view of a light source module according to the fifth embodiment of the disclosure.

FIG. 10 is a schematic front view of a light source module according to the fifth embodiment of the disclosure. With reference to FIG. 10, the difference between a light source module 20B of this embodiment and the light source module 20A of FIG. 8 lies in that the number of light sources and auxiliary light sources is different. Specifically, in comparison with the light source module 20A in FIG. 8, in the light source module 20B, another second light source 202, another third light source 203, and another first auxiliary light source 201A are also disposed on the other side of the first light source 201 (e.g., the left side in FIG. 10). The first light source 201, the two third light sources 203, and the two first auxiliary light sources 201A are disposed on a side of the first light incident surface 100a of a light guide plate 100C, and the two second light sources 202 are disposed on a side of the second light incident surface 100b of the light guide plate 100C. Since the configuration of the second light source 202, the third light source 203, and the first auxiliary light source 201A located on the other side of the first light source 201 in the light source module 20B is similar to the configuration of the light source module 20A in FIG. 8, reference may therefore be made to the relevant paragraphs of the above-mentioned embodiments for detailed description, which will not be repeated herein.

For example, in this embodiment, the two second light sources 202, the two third light sources 203, and the two first auxiliary light sources 201A located on opposite sides of the first light source 201 are disposed taking the first light source 201 as the center of symmetry. That is to say, in the arrangement direction of the first light source 201 and the third light source 203, the respective distances between the two second light sources 202 (or the two third light sources 203 or the two first auxiliary light sources 201A) and the first light source 201 is substantially the same.

Different from the light source module 20A in FIG. 8, in the arrangement direction of the first light source 201 and the third light source 203 (or in a direction parallel to the first light incident surface 100a), the first auxiliary light source 201A of this embodiment may be disposed in the middle of the first light source 201 and the third light source 203, between the first light source 201 and the third light source 203, or between the first light source 201 and the second light source 202. That is, the first auxiliary light source 201A of the light source module 20B is not disposed at a position closer to the first light source 201 or the third light source 203. More specifically, the first auxiliary light source 201A of this embodiment can present the viewer with the patterns (e.g., the first pattern IM11, the second pattern IM12, and the third pattern IM13 in FIG. 5) formed of the first optical microstructures 110, and the patterns formed of the third optical microstructures 130 (e.g., the first pattern IM31, the second pattern IM32, and the third pattern IM33 in FIG. 5) in a larger range of view angle.

Figure 11:
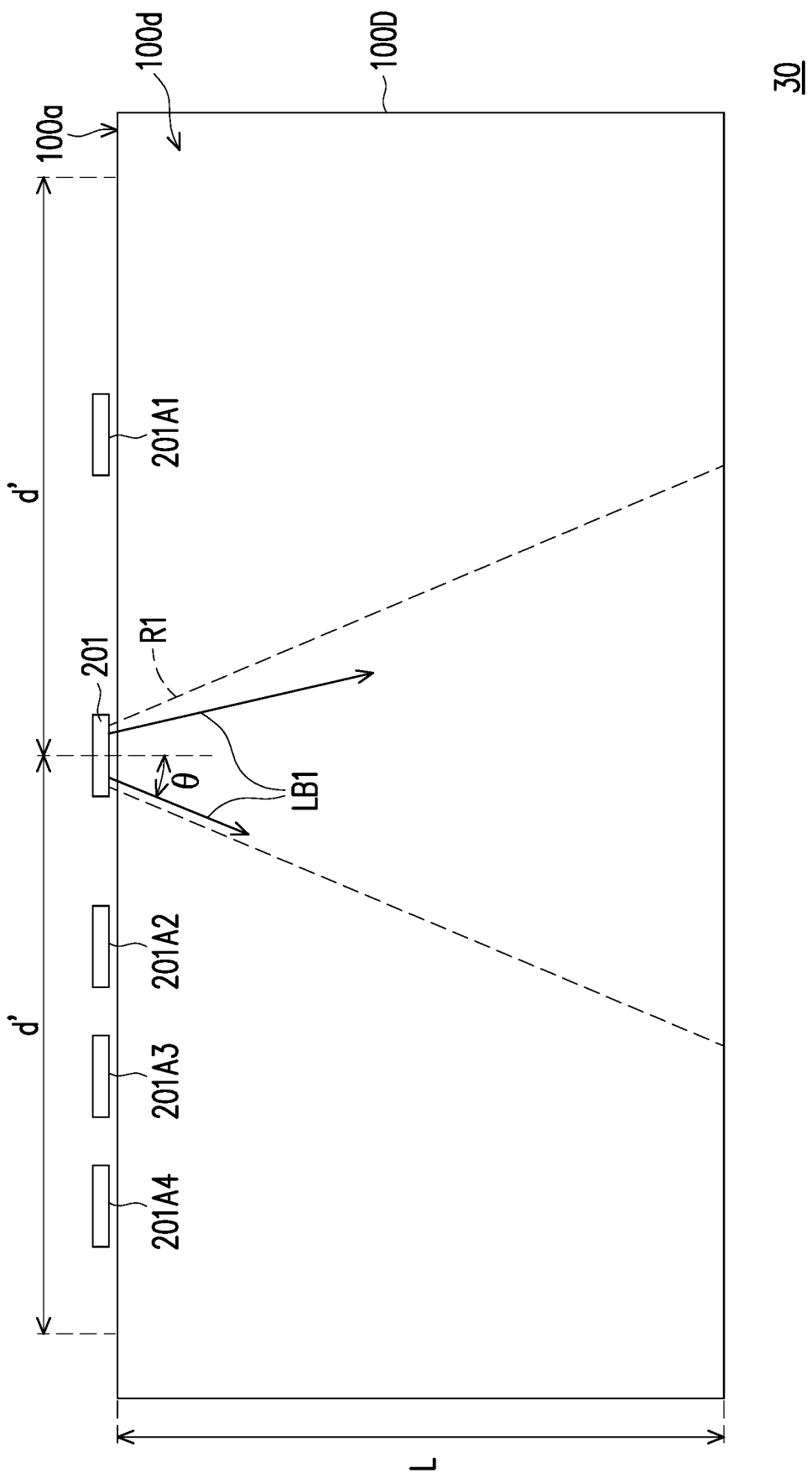
FIG. 11 is a schematic front view of a light source module according to the sixth embodiment of the disclosure.

FIG. 11 is a schematic front view of a light source module according to the sixth embodiment of the disclosure. With reference to FIG. 11, the difference between a light source module 30 of this embodiment and the light source module 20A of FIG. 8 lies in that the number of light sources and first auxiliary light sources is different, and that the configuration of the first auxiliary light sources is different. Specifically, the number of light source of the light source module 30 is one (e.g., the first light source 201), and the number of first auxiliary light sources is four (e.g., a first auxiliary light source 201A1, a first auxiliary light source 201A2, a first auxiliary light source 201A3, and a first auxiliary light source 201A4).

In this embodiment, the first light source 201 and the four first auxiliary light sources are all disposed on a side of the first light incident surface 100a side of a light guide plate 100D. The first light source 201 is configured to emit the first light beams LB1 toward the first light incident surface 100a of the light guide plate 100D, and these first light beams LB1 are transmitted within the range of the first light emitting region R1 of the light guide plate 100D and are emitted from the light guide plate 100D through the light emitting surface 100d. From another point of view, the transmission path of the first light beam LB1 emitted by the first light source 201 within the light guide plate 100D may define the first light emitting region R1 of the light guide plate 100D.

It is noteworthy that in this embodiment, the distance between each of the four first auxiliary light sources and the first light source 201 is less than a maximum distance d', and the maximum distance d' is $2L \cdot \tan(\theta)$, where $\theta$ is a maximum value of the included angle (i.e., the maximum included angle) between each of the first light beams LB1 after entering the light guide plate 100D and the normal direction of the first light incident surface 100a, and L is a length of the light guide plate 100D in a direction perpendicular to the first light incident surface 100a. In other words, the maximum distance d' herein may define the maximum range extending from the geometric center of the first auxiliary light source 201A toward both sides. In addition, the first auxiliary light sources are all disposed within the maximum range. For example, when the light guide plate 100D is made of polymethyl methacrylate and the first light incident surface 100a is a smooth surface, the above-mentioned maximum included angle $\theta$ is about 42 degrees, but not limited thereto.

In this embodiment, the first auxiliary light sources are disposed on two opposite sides of the first light source 201, and the respective numbers of first auxiliary light sources on the two sides may be selectively different or same, which is not particularly limited by the disclosure. For example, the numbers of first auxiliary light sources disposed on the right side and the left side of the first light source 201 in FIG. 11 are respectively one (i.e., the first auxiliary light source 201A1) and three (i.e., the first auxiliary light source 201A2, the first auxiliary light source 201A3, and the first auxiliary light source 201A4), but they are not limited thereto.

Through disposing a plurality of first auxiliary light sources, of which the numbers may be same or different on opposite sides of the first light source 201, where the distance between each of these first auxiliary light sources and the first light source 201 is less than $2L \cdot \tan(\theta)$ (i.e., the maximum distance d'), the viewer can see the patterns formed of the first optical microstructures (e.g. the first pattern IM11, the second pattern IM12, and the third pattern IM13 in FIG. 1) in a larger range of view angle, which helps to improve the adaptability of the light source module 30 to different application scenarios. In other words, the design margin of the light source module 30 can be increased. It is worth mentioning that the design of the maximum distance d' for the auxiliary light source disposed in the light source module 30 may also be applied to the different embodiments shown in FIG. 1 to FIG. 9.

In summary of the foregoing, in the light source module according to an embodiment of the disclosure, the light guide plate has the first light incident surface and the second light incident surface that are disposed opposite each other, and the bottom surface that is connected to the light incident surfaces. In addition, the first light source and the second light source are respectively disposed on two sides of the two light incident surfaces of the light guide plate. Through disposing the first optical microstructures facing the first light source and disposing the second optical microstructures facing the second light source on the bottom surface of the light guide plate, the large-size image display can be realized, and the overall image brightness and uniformity can be improved at the same time.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module, comprising:
   a light guide plate having a first light incident surface and a bottom surface connected to the first light incident surface;
   a first light source disposed on a side of a first light incident surface of the light guide plate; and
   a plurality of first optical microstructures disposed on the bottom surface of the light guide plate, wherein the first optical microstructures each have a first light receiving surface, and the first light receiving surfaces are disposed facing the first light source, wherein the first light receiving surfaces of a first part of the first optical microstructures each have a first edge straight line at a junction with the bottom surface, and a perpendicular bisector of each of the first edge straight lines of the first part of the first optical microstructures passes through the first light source, the first part of the first optical microstructures forms a first pattern, a second part of the first optical microstructures forms a second pattern, the first pattern and the second pattern partially overlap each other, and the first pattern and the second pattern are patterns of an object at different view angles.

2. The light source module according to claim 1, further comprising:
   a second light source disposed on a side of a second light incident surface of the light guide plate, wherein a second light incident surface is disposed opposite the first light incident surface, and is connected to the bottom surface; and
   a plurality of second optical microstructures disposed on the bottom surface of the light guide plate, wherein the second optical microstructures each have a second light receiving surface, and the second light receiving surfaces of the second optical microstructures are disposed facing the second light source.

3. The light source module according to claim 2, wherein the first light source is configured to emit a plurality of first light beams toward the first light incident surface of the light guide plate, the first light beams are transmitted within a range of a first light emitting region of the light guide plate, the second light source is configured to emit a plurality of second light beams toward the second light incident surface of the light guide plate, and the second light beams are transmitted within a range of a second light emitting region of the light guide plate, wherein an area of an overlapping region between the first light emitting region and the second light emitting region is less than 10% of an area of the first light emitting region.

4. The light source module according to claim 2, wherein a first angle is present between each of the first light receiving surfaces and the bottom surface, and a second angle is present between each of the second light receiving surfaces and the bottom surface, wherein the first angle and the second angle fall within a range between 35 degrees and 55 degrees.

5. The light source module according to claim 2, wherein the second light receiving surfaces of a first part of the second optical microstructures each have a second edge at a junction with the bottom surface, and a vertical bisector of the second edge passes through the second light source.

6. The light source module according to claim 5, wherein the first light receiving surfaces of a second part of the first optical microstructures each have a third edge at a junction with the bottom surface, and the second light receiving surfaces of a second part of the second optical microstructures each have a fourth edge at a junction with the bottom surface, wherein a first included angle is present between the perpendicular bisector of the first edge of each of the first optical microstructures and the first light incident surface, a second included angle is present between a perpendicular bisector of the second edge of each of the second optical microstructures and the second light incident surface, a third included angle is present between a perpendicular bisector of the third edge of each of the first optical microstructures and the first light incident surface, and a fourth included angle is present between a perpendicular bisector of the fourth edge of each of the second optical microstructures and the second light incident surface, wherein an angle difference between the first included angle and the third included angle of adjacent first optical microstructures is greater than an angle difference between the second included angle and the fourth included angle of adjacent second optical microstructures.

7. The light source module according to claim 6, wherein the first included angle, the second included angle, the third included angle, and the fourth included angle are 90 degrees or fall within a range between 45 degrees and 90 degrees.

8. The light source module according to claim 2, further comprising:
   a third light source disposed on a side of the first light incident surface of the light guide plate, wherein in an arrangement direction of the first light source and the third light source, the second light source is located between the first light source and the third light source, wherein the second light source is configured to emit a plurality of second light beams, the second light beams are transmitted within a range of a second light emitting region of the light guide plate, the third light source is configured to emit a plurality of third light beams, and the third light beams are transmitted within a range of third light emitting region of the light guide plate, wherein an area of an overlapping region of the second light emitting region and the third light emitting region is less than 10% of an area of the second light emitting region; and
   a plurality of third optical microstructures disposed on the bottom surface of the light guide plate, wherein the third optical microstructures each have a third light receiving surface, and the third light receiving surfaces are disposed facing the third light source.

9. The light source module according to claim 8, further comprising:
   at least one first auxiliary light source disposed on a side of the first light incident surface of the light guide plate and located between the first light source and the third light source.

10. The light source module according to claim 1, further comprising:
   at least one first auxiliary light source disposed on a side of the first light incident surface of the light guide plate, wherein the light guide plate has a length in a direction perpendicular to the first light incident surface, the first light source is configured to emit a plurality of first light beams toward the first light incident surface of the light guide plate, and a distance between each of the at least one first auxiliary light source and the first light source is less than $2L\cdot\tan(\theta)$, wherein $\theta$ is a maximum included angle between the first light beams and a normal direction of the first light incident surface, and L is a length of the light guide plate in a direction perpendicular to the first light incident surface.

* * * * *